(12) United States Patent
Kajihara

(10) Patent No.: US 8,934,128 B2
(45) Date of Patent: Jan. 13, 2015

(54) CONTROL DEVICE, PRINT SYSTEM, PRINT DEVICE, PRINT CONTROL METHOD AND PROGRAM

(71) Applicant: Seiko Epson Corporation, Tokyo (JP)

(72) Inventor: Mikihiro Kajihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 7 days.

(21) Appl. No.: 13/758,254

(22) Filed: Feb. 4, 2013

(65) Prior Publication Data

US 2013/0201499 A1 Aug. 8, 2013

(30) Foreign Application Priority Data

Feb. 6, 2012 (JP) ................................. 2012-022893

(51) Int. Cl.
*H04N 1/40* (2006.01)
*G06K 15/02* (2006.01)
*G06F 3/12* (2006.01)

(52) U.S. Cl.
CPC .............. *G06K 15/02* (2013.01); *G06F 3/1204* (2013.01); *G06F 3/1253* (2013.01); *G06F 3/1284* (2013.01); *G06F 3/121* (2013.01); *G06F 3/1234* (2013.01)
USPC ......................................... 358/1.16; 358/468

(58) Field of Classification Search
USPC ......... 358/1.9, 2.1, 1.13–1.17, 448, 468, 474, 358/3.28, 402–403
See application file for complete search history.

(56) References Cited

U.S. PATENT DOCUMENTS

| 5,496,117 | A | | 3/1996 | Sawada et al. | |
|---|---|---|---|---|---|
| 5,737,504 | A | * | 4/1998 | Yamada | ...................... 358/1.18 |
| 5,903,903 | A | * | 5/1999 | Kennedy | ....................... 715/234 |

FOREIGN PATENT DOCUMENTS

| JP | 7-186456 A | 7/1995 |
|---|---|---|
| JP | 2010-105198 A | 5/2010 |

* cited by examiner

*Primary Examiner* — Thomas D Lee
*Assistant Examiner* — Stephen M Brinich
(74) *Attorney, Agent, or Firm* — ALG Intellectual Property, LLC

(57) ABSTRACT

A control device which designates sequential number printing to print while updating character information, comprising: a sequential number setting unit which carries out sequential number setting to carry out the sequential number printing, on the character information; a current value designating unit which collectively designates a current value to all the character information with sequential number setting, in one document; and a print instruction unit which gives an instruction to start the sequential number printing at the current value that is designated.

12 Claims, 10 Drawing Sheets

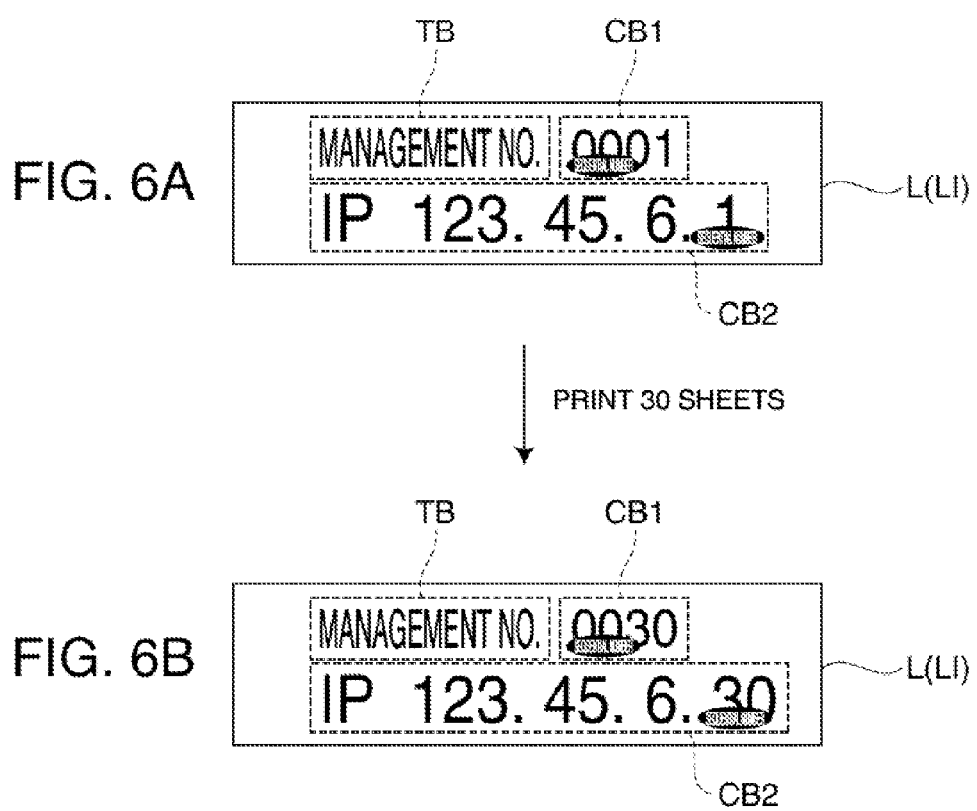

PRINT 5 SHEETS

SEQUENTIAL NUMBER SETTING

< CHARACTER INFORMATION A >
- INITIAL VALUE : 0
- INCREMENT : 1
- NUMBER OF REPETITIONS : 1
- MAXIMUM VALUE : 3

< CHARACTER INFORMATION B >
- INITIAL VALUE : 0
- INCREMENT : 2
- NUMBER OF REPETITIONS : 2
- MAXIMUM VALUE : 4

< CHARACTER INFORMATION C >
- INITIAL VALUE : 0
- INCREMENT : -1
- NUMBER OF REPETITIONS : 1
- MAXIMUM VALUE : -3

FIG. 8A

DESIGNATED COUNTER VALUE AND START VALUE OF EACH PIECE OF CHARACTER INFORMATION

| COUNTER VALUE | 0 | 1 | 2 | 3 | 4 | 5 | 6 | 7 | ... |
|---|---|---|---|---|---|---|---|---|---|
| CHARACTER INFORMATION A | 0 | 1 | 2 | 3 | 0 | 1 | 2 | 3 | ... |
| CHARACTER INFORMATION B | 0 | 0 | 2 | 2 | 4 | 4 | 0 | 0 | ... |
| CHARACTER INFORMATION C | 0 | -1 | -2 | -3 | 0 | -1 | -2 | -3 | ... |

FIG. 8B

SEQUENTIAL NUMBER SETTING

< CHARACTER INFORMATION A >
$\begin{pmatrix} \text{INITIAL VALUE} & : 0 \\ \text{INCREMENT} & : 1 \\ \text{NUMBER OF REPETITIONS} & : 1 \\ \text{MAXIMUM VALUE} & : 3 \end{pmatrix}$ < CHARACTER INFORMATION B >
$\begin{pmatrix} \text{INITIAL VALUE} & : 0 \\ \text{INCREMENT} & : 2 \\ \text{NUMBER OF REPETITIONS} & : 2 \\ \text{MAXIMUM VALUE} & : 4 \end{pmatrix}$

FIG. 9A

DESIGNATION OF CURRENT VALUE = START VALUE : 「2」
( NO CHANGE IN SEQUENTIAL NUMBER SETTING )

FIG. 9B

NUMBER OF TIMES OF PRINT AND CHANGE IN
EACH PIECE OF CHARACTER INFORMATION

| NUMBER OF TIMES OF PRINT | 1 | 2 | 3 | 4 | 5 | 6 | 7 | 8 | ... |
|---|---|---|---|---|---|---|---|---|---|
| CHARACTER INFORMATION A | 2 | 3 | 0 | 1 | 2 | 3 | 0 | 1 | ... |
| CHARACTER INFORMATION B | 2 | 2 | 4 | 4 | 0 | 0 | 2 | 2 | ... |

FIG. 9C

SEQUENTIAL NUMBER SETTING

< CHARACTER INFORMATION A >

$\begin{pmatrix} \text{INITIAL VALUE} & : 0 \\ \text{INCREMENT} & : 1 \\ \text{NUMBER OF REPETITIONS} & : 1 \\ \text{MAXIMUM VALUE} & : 3 \end{pmatrix}$ < CHARACTER INFORMATION B >

$\begin{pmatrix} \text{INITIAL VALUE} & : 0 \\ \text{INCREMENT} & : 2 \\ \text{NUMBER OF REPETITIONS} & : 2 \\ \text{MAXIMUM VALUE} & : 4 \end{pmatrix}$

FIG. 10A

DESIGNATION OF CURRENT VALUE = START VALUE : 「2」
→ SETTING OF INITIAL VALUE : 「2」
SEQUENTIAL NUMBER SETTING AFTER CHANGE

< CHARACTER INFORMATION A >

$\begin{pmatrix} \text{INITIAL VALUE} & : \underline{2} \\ \text{INCREMENT} & : 1 \\ \text{NUMBER OF REPETITIONS} & : 1 \\ \text{MAXIMUM VALUE} & : 3 \end{pmatrix}$ < CHARACTER INFORMATION B >

$\begin{pmatrix} \text{INITIAL VALUE} & : \underline{2} \\ \text{INCREMENT} & : 2 \\ \text{NUMBER OF REPETITIONS} & : 2 \\ \text{MAXIMUM VALUE} & : 4 \end{pmatrix}$

FIG. 10B

NUMBER OF TIMES OF PRINT AND CHANGE IN
EACH PIECE OF CHARACTER INFORMATION

| NUMBER OF TIMES OF PRINT | 1 | 2 | 3 | 4 | 5 | 6 | 7 | 8 | ... |
|---|---|---|---|---|---|---|---|---|---|
| CHARACTER INFORMATION A | 2 | 3 | 2 | 3 | 2 | 3 | 2 | 3 | ... |
| CHARACTER INFORMATION B | 2 | 2 | 4 | 4 | 2 | 2 | 4 | 4 | ... |

FIG. 10C

CONTROL DEVICE, PRINT SYSTEM, PRINT DEVICE, PRINT CONTROL METHOD AND PROGRAM

CROSS-REFERENCE

The entire disclosure of Japanese Patent Application No. 2012-022893 filed on Feb. 6, 2012, which is hereby incorporated by reference in its entirety.

BACKGROUND

1. Technical Field

The present invention relates to a control device, a print system, a print device, a print control method and a program in which sequential number printing to print while updating character information is designated.

2. Related Art

According to the related art, a so-called "sequential number printing function" to print while sequentially incrementing or decrementing character information indicating a character string of numbers, alphabetical letters and the like is known. In a print device having this "sequential number printing function", for example, when sequential number printing of "1" to "5" is set and the user wants to print only an intermediate number (for example, "3" or "4") because of an interruption of printing or the like, the initial value needs to be reset to "3", or the character information needs to be counted to a desired start value "3" by executing printing.

Thus, JP-A-2010-105198 (Japanese Patent No. 4494502) is proposed in order to facilitate partial re-execution of sequential number printing. JP-A-2010-105198 (Japanese Patent No.4494502) has a configuration in which the value of a sequential number is stored at the end of printing so that the stored value of the sequential number can be read out to start sequential number printing from an intermediate number even in the case where the power of the label printer is turned off. Thus, it is very convenient when continuing the previous sequential number printing.

However, in the configuration of JP-A-2010-105198 (Japanese Patent No.4494502), since a storage unit is provided in the label printer, the cost is increased. Meanwhile, in a technique in which the initial value is reset manually, when there are plural pieces of character information with sequential number setting on one label (in one document), the initial value must be changed at many positions, which is troublesome.

SUMMARY

An advantage of some aspects of the invention is to provide a control device, a print system, a print device, a print control method and a program by which partial re-execution of sequential number printing can be carried out with a simple configuration, irrespective of the number of pieces of character information with sequential number setting.

An aspect of the invention is directed to a control device which designates sequential number printing to print while updating character information, and includes: a sequential number setting unit which carries out sequential number setting to carry out the sequential number printing, on the character information; a current value designating unit which collectively designates a current value to all the character information with sequential number setting, in one document; and a print instruction unit which gives an instruction to start the sequential number printing at the designated current value.

Another aspect of the invention is directed to a print device capable of executing sequential number printing to print while updating character information, including: a sequential number setting unit which carries out sequential number setting to carry out the sequential number printing, on the character information; a current value designating unit which collectively designates a current value to all the character information with sequential number setting, in one document; and a sequential number print unit which starts the sequential number printing at the designated current value.

Still another aspect of the invention is directed to a print control method for controlling sequential number printing to print while updating character information, including: setting sequential numbers to carry out the sequential number printing, on the character information; collectively designating a current value to all the character information with sequential number setting, in one document; and performing control to start the sequential number printing at the designated current value.

With these configurations, since the current value can be designated collectively to all the character information with sequential number setting, partial re-execution of the sequential number printing can easily be carried out irrespective of the number of pieces of character information with sequential number setting. Also, since no storage unit is needed, the element of rise in cost can be eliminated.

The current value refers to a value that is designated at the current time point in order to specify a start value of the sequential number printing in each piece of character information. Also, the current value may be equal to the start value or may be different from the current value.

To designate the current value, a character (number, alphabetical letter or the like) may be designated directly, or an increment button or decrement button may be used to designate the current value.

In the above control device, the character information with sequential number setting may be updated based on a predetermined update rule and a counter value of the sequential number printing. The current value designating unit may designate the counter value as the current value.

With this configuration, since the counter value of the sequential number printing is designated as the current value, an appropriate value can be designated irrespective of the sequential number setting of each piece of character information. If an initial value and an end value (maximum value or minimum value) can be set as sequential number setting and the start value is designated as the current value, the start value may not fall between the initial value and the end value that are set and therefore the designated start value may be invalid. However, such inconvenience does not occur since the configuration to designate the counter value is employed.

In the above control device, the current value designating unit may designate the current value by pressing a button which causes the counter value to change one by one. The device may further includes a display section which switches and displays the start value of the sequential number printing in each piece of character information every time the button is pressed.

With this configuration, the counter value can be changed by a simple operation of pressing the button. Also, since the display section is provided, the start value (the first value to be printed when the sequential number printing is carried out) of each piece of character information corresponding to the counter value can be confirmed.

In the above control device, the sequential number setting unit may be capable of setting an initial value and an end value of the sequential number printing, and the display section may switch the start value within a range between the initial value and the end value of each piece of character information every time the button is pressed.

With this configuration, the start value can be switched within the range between the initial value and the end value set for each piece of character information.

In the above control device, the sequential number setting unit may be capable of setting the number of repetitions and an increment of the sequential number printing, and the display section may switch the start value every time the button is pressed, in accordance with the setting of the number of repetitions and the setting of the increment for each piece of character information.

With this configuration, the start value can be switched in accordance with the setting of the number of repetitions and the setting of an increment set for each piece of character information.

In the above control device, the print instruction unit may give an instruction to perform the sequential number printing in which the designated current value is used as a start value.

With this configuration, the start value of the sequential number printing can be designated collectively.

In the above control device, the sequential number setting unit may be capable of setting an initial value of the sequential number printing, and the current value designating unit may rewrite the initial value of each piece of character information with the designated current value, as the current value is designated.

With this configuration, the initial value of each piece of character information can be rewritten collectively.

Yet another aspect of the invention is directed to a print system including the above control device, and a print device which carries out the sequential number printing.

Still yet another aspect of the invention is directed to a program causes a computer to execute each processing in the above print control method.

With these configurations, a print system and a print control method in which partial re-execution of the sequential number printing can be carried out with a simple configuration irrespective of the number of pieces of character information with sequential number setting can be realized.

BRIEF DESCRIPTION OF THE DRAWINGS

The invention will be described with reference to the accompanying drawings, wherein like numbers reference like elements.

FIG. 6A shows a label image displayed before printing a sequential number. FIG. 6B shows a label image displayed after printing sequential numbers corresponding to 30 sheets.

FIG. 8A shows an example of sequential number setting. FIG. 8B is a table showing the relation between designated counter values and start values of each piece of character information.

FIG. 9A shows an example of sequential number setting. FIG. 9B shows an example of designation of a current value in Modification 1. FIG. 9C is a table showing the number of times of printing and changes in the value of each piece of character information.

FIG. 10A shows an example of sequential number setting. FIG. 10B shows an example of designation of a current value in Modification 2 and an example of sequential number setting changed by the designation. FIG. 10C is a table showing the number of times of printing and changes in the value of each piece of character information.

DESCRIPTION OF EXEMPLARY EMBODIMENTS

Figure 1:
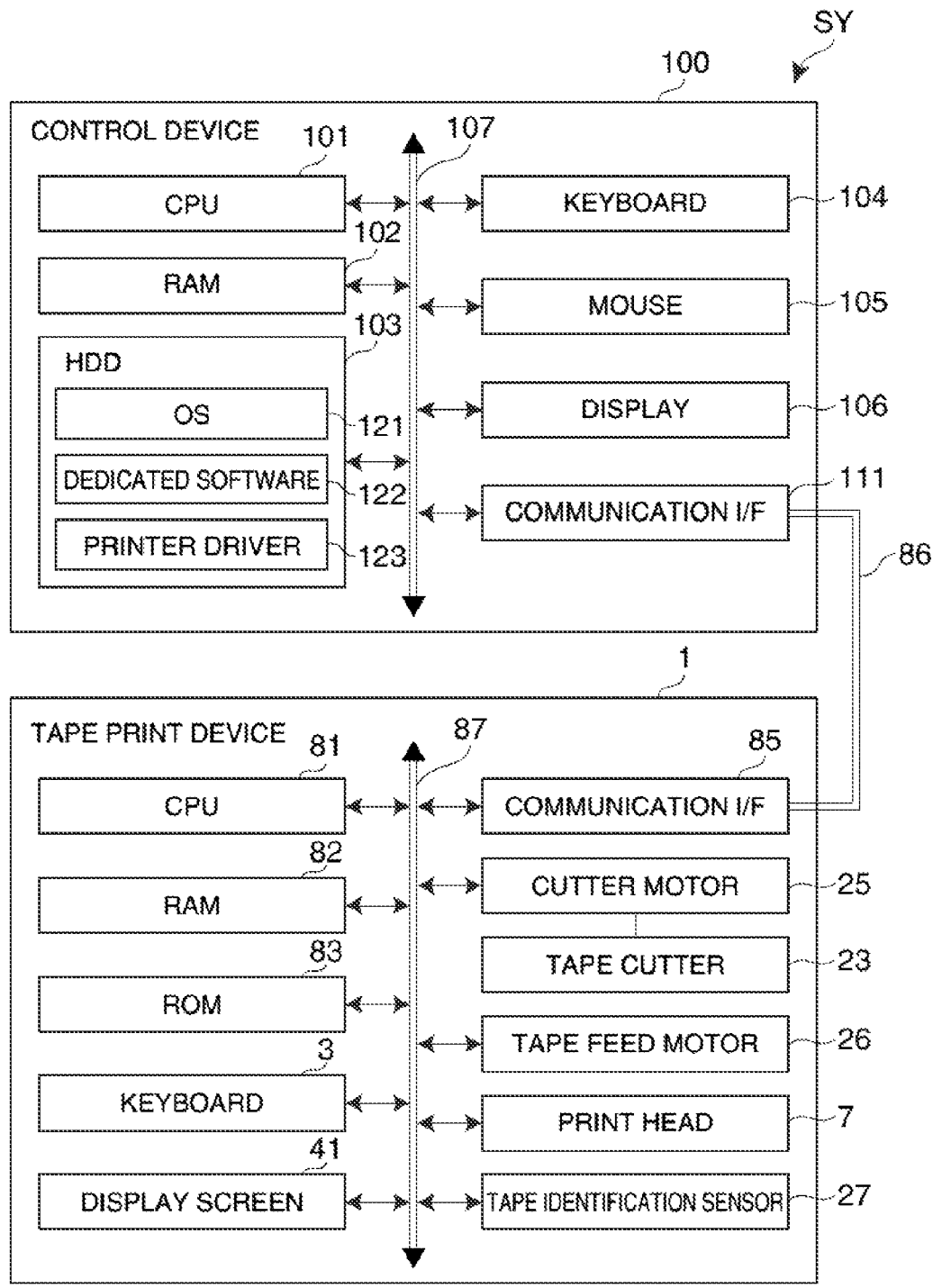
FIG. 1 is a block diagram showing the configuration of a print system.

Hereinafter, a control device, a print system, a print device, a print control method and a program according to an embodiment of the invention will be described with reference to the accompanying drawings. FIG. 1 is a block diagram showing the configuration of a print system SY. As shown in FIG. 1, the print system SY includes a control device 100 and a tape print device 1. These devices are connected to each other via a cable 86. The control device 100 and the tape print device 1 maybe connected to each other via a network (the internet or a local area network) or may be connected via wireless communication.

The control device 100 is a general personal computer and includes a CPU (central processing unit) 101, a RAM (random access memory) 102, an HDD (hard disk drive) 103, a keyboard 104, a mouse 105, a display 106, a communication I/F 111, and a bus 107 which connects each of these components.

The HDD 103 stores dedicated software 122 and a printer driver 123 as well as an OP (operating system) 121. The dedicated software 122 is software for editing labels and is used to execute various kinds of processing which will be described later, such as creation of print data, sequential number setting, and print instruction to the tape print device 1. The printer driver 123 acts as intermediary between the control device 100 and the tape print device 1. The communication I/F 111 is connected to a communication I/F 85 of the tape print device 1 via the cable 86 conforming to the USB standards.

The tape print device 1 includes a CPU 81, a RAM 82, a ROM (read only memory) 83, a keyboard 3, a display screen 41, the communication I/F 85, a cutter motor 25, a tape cutter 23, a tape feed motor 26, a print head 7, a tape identification sensor 27, and a bus 87 which connects each of these components.

The CPU 81 is a central processing unit. The RAM 82 is used as a work area when the CPU 81 carries out various kinds of control. The ROM 83 stores a control program and control information for the CPU 81 to carry out various kinds of control. The display screen 41 displays a text editing screen and various setting screens when the tape print device 1 is used as a standalone unit. The keyboard 3 functions as a text input unit and an operation unit when the tape print device 1 is used as a standalone unit.

Figure 2:
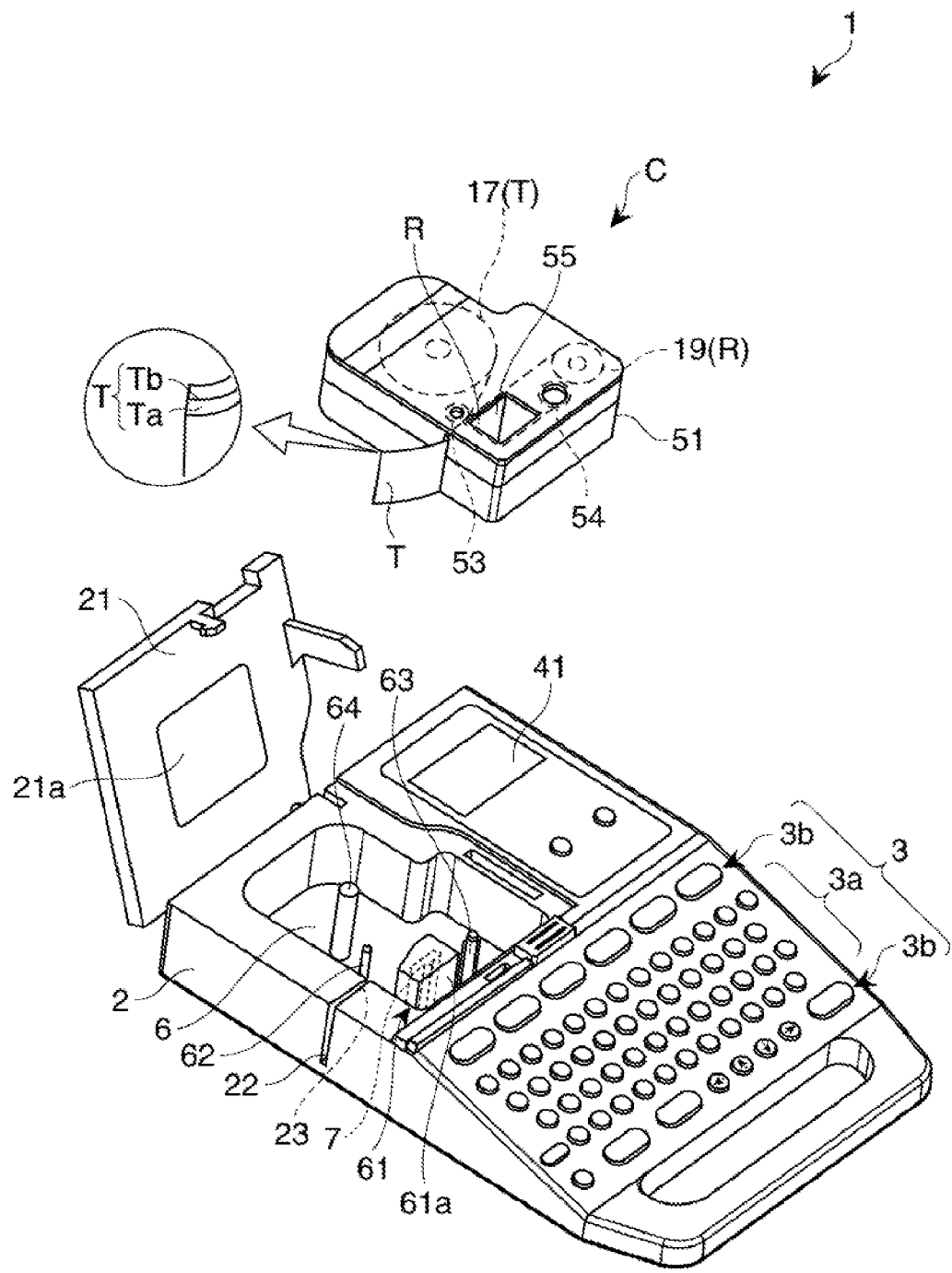
FIG. 2 is an external perspective view in the state where the lid of a tape print device is opened.

The cutter motor 25 is connected with the tape cutter 23 and cuts a printed tape T (see FIG. 2). The tape feed motor 26 and the print head 7 carry out printing on the tape T while feeding the tape T. The tape identification sensor 27 detects the type of the tape T (width, material and the like of the tape) housed in a tape cartridge C (see FIG. 2).

Next, the device configuration of the tape print device 1 will be described with reference to FIG. 2. FIG. 2 is an external perspective view showing the state where an open-close lid 21 of the tape print device 1 is opened. As shown in FIG. 2, the contour of the tape print device 1 is formed by a device case 2. On a top side of a front part of the device case 2, the keyboard 3 including various input keys and buttons is arranged. On a top side of a rear part, the open-close lid 21 is attached on the left side and the display screen 41 is arranged on the right side.

Inside the open-close lid 21, a cartridge loading section 6 for loading the tape cartridge C therein is formed as a recess. The tape cartridge C is removably loaded into the cartridge loading section 6 in the state where the open-close lid 21 is opened. A view window 21a to enable visual recognition of loading or non-loading of the tape cartridge C in the state where the open-close lid 21 is closed is formed in the open-close lid 21. On the keyboard 3, a character key group 3a with a full-key configuration based on the JIS arrangement and a function button group 3b to designate various operations are arranged.

On a left lateral part of the device case 2, a tape discharge port 22 connecting the cartridge loading section 6 and the outside is formed. In this tape discharge port 22, the tape cutter 23 to cut the tape T fed from a tape feeding mechanism, not shown, is present. As the printed tape T is fed by a predetermined length from the tape discharge port 22 and the feeding is temporarily stopped, the printed tape T is cut by the tape cutter 23, thus creating a strip-like label L (see FIGS. 6A and 6B or the like).

Meanwhile, the cartridge loading section 6 has ahead unit 61 including the thermal-type print head 7 within a head cover 61a, a platen drive shaft 62 facing the print head 7, a take-up drive shaft 63 which takes up an ink ribbon R, described later, and a positioning protrusion 64 for a tape reel 17, described later. Below the cartridge loading section 6, the tape feed motor 26 (see FIG. 1) which rotates the platen drive shaft 62 and the take-up drive shaft 63 to serve as a tape feeding mechanism is arranged inside.

The tape cartridge C accommodates the tape reel 17 on which the tape T with a predetermined width (approximately 4 to 36 mm) is wound, at a top central part within a cartridge case 51, and a ribbon reel 19 on which the ink ribbon R is wound, at a bottom right part. At a lower left part of the tape reel 17, a through-hole 55 to insert the head cover 61a covering the head unit 61 is formed. Also, a ribbon take-up reel 54 is arranged near the ribbon reel 19. The ink ribbon R drawn out from the ribbon reel 19 is taken up by the ribbon take-up reel 54 in such a way as to circle around the head cover 61a.

Meanwhile, the tape T includes a recording tape Ta with an adhesive layer formed on a back side, and a release tape Tb bonded to the recording tape Ta with this adhesive layer. The tape T is wound in a roll shape and housed within the cartridge case 51, with the recording tape Ta facing outside and the releasing tape Tb facing inside. As the tape T, plural different types of tape are prepared and the tape T of one of these types (and the ink ribbon R) is housed in each cartridge case 51. On the back side of the cartridge case 51, plural holes (not shown) specifying the type of the tape cartridge C are provided. Corresponding to the plural holes, plural tape identification sensors (micro switches or the like) 27 (see FIG. 1) which detect the holes are provided in the cartridge loading section 6. As the tape identification sensors 27 detect the state of the plural holes, the tape type can be determined.

Next, an editing screen 91 displayed on the display 106 of the control device 100 will be described with reference to FIG. 3. The editing screen 91 can be displayed on the display 106 by starting up the dedicated software 122. On the editing screen 91, an editing area 92 (display section) which displays an image of the label L (hereinafter referred to as a "label image LI"), a menu bar 93 to perform menu selection, a basic operation tool bar 94 to perform basic operations, an input tool bar 95 to input characters, graphic patterns and the like, and an editing tool bar 96 to edit characters and graphic patterns are provided.

The basic operation tool part 94 includes a create new button 31 to create new print data, a save button 32 to save created print data, a read button 33 to read saved image data and displays the image data in the editing area 92, a print button 34 (print instruction unit) to execute printing based on the result of editing displayed in the editing area 92, and the like.

The input tool bar 95 includes a block selection button 35 to select the tape T and a block (a text block TB, a sequential number block CB, described later, or the like), a character input button 36 to input a character, and an increment button 37 and a decrement button 38 to designate a counter value (current value) of sequential number printing. In this embodiment, by increasing and decreasing the counter value using the increment button 37 and the decrement button 38, a start value (the first value to be printed when sequential number printing is carried out) of sequential number printing is designated (current value designating unit). This part will be described in detail later.

The editing tool bar 96 includes a tape width acquisition button 97 to acquire the tape width of the tape T loaded in the tape print device 1 and display the tape width in a tape width display box 98. In the tape width display box 98, an up-and-down button 99 is provided and the tape width can manually be inputted.

The editing area 92 displays the label image LI having the acquired tape width and a predetermined length. The example of FIG. 3 shows the state where a text block TB showing a character string "Management No." is already inputted by operating the character input button 36. Also, the dotted line frame surrounding the block is given for convenience of explanation but is not actually displayed.

Figure 4:
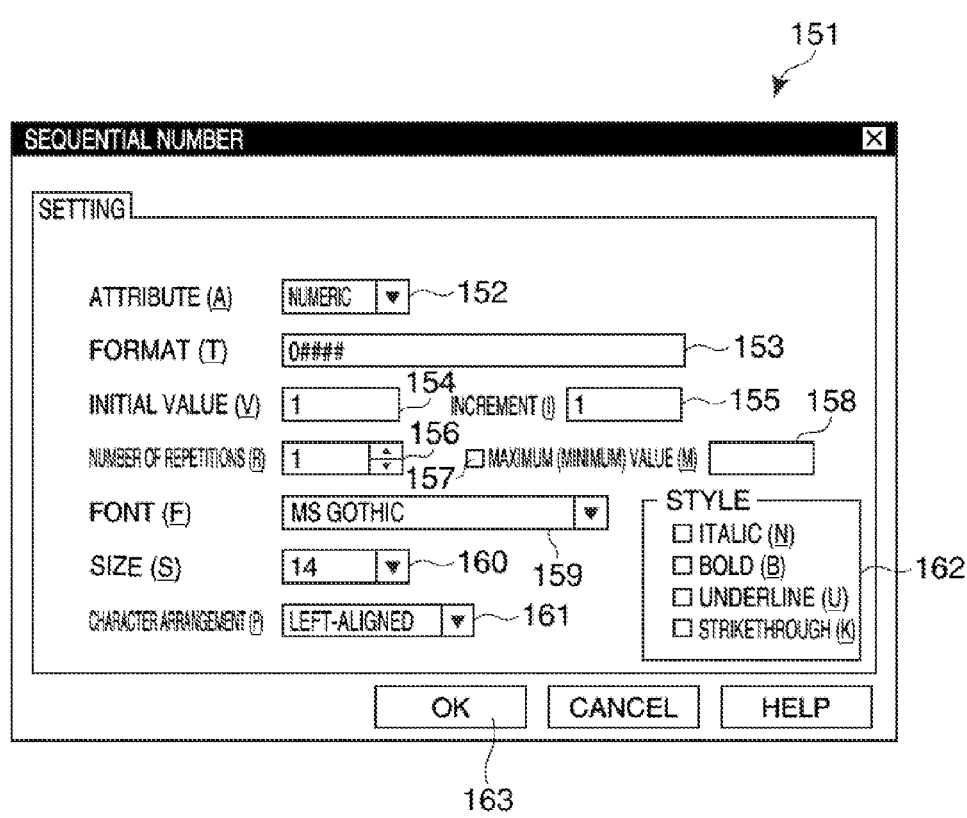
FIG. 4 shows an example of display on a sequential number setting screen.

Next, a sequential number setting screen 151 that can be called from the above editing screen 91 will be described with reference to FIG. 4. The "sequential number setting unit" mentioned in the appended claims includes this sequential number setting screen 151 and operation units such as the keyboard 104 and the mouse 105 as principal parts. The sequential number setting screen 151 is a dialog box to carry out sequential number setting and can be displayed by selecting "sequential number" from an "insert" menu (not shown) in the menu bar 93. As setting items, ten items are provided, that is, attribute, format, initial value, increment, number of repetitions, maximum (minimum) value (end value), font, size, character arrangement, and style. Character information in a sequential number block, described later, is updated based on these items (predetermined update rule) and the counter value.

First, in an attribute box 152, "numeric" or "alphabetic" is selected. In a format box 153, a number to be displayed is expressed by "#". When "0" is inputted before "#" as shown in FIG. 4, "0" can be displayed in the digit preceding the sequential number. For example, in the setting on the sequential number setting screen 151 shown in FIG. 4, an initial value "0001" is displayed. In the format box 153, other characters than sequential numbers can be inputted. The character information mentioned in the appended claims refers to a number of one or more digits expressed by "#" or a string of one or more alphabetic letters.

In an initial value box 154, when "numeric" is selected in the attribute box 152, the first number to start counting with is inputted. Meanwhile, when "alphabetic" is selected in the attribute box 152, the first alphabetic letter to start counting with is inputted. In an increment box 155, the increment that is added every time printing is made is designated by a number of up to five digits. In the increment box 155, a negative value or a decimal point can be designated. For example, when the increment is set to "1", the number increases one by one, such as 1, 2, 3 . . . , whereas when the increment is set to "−2", the number decreases by two each, such as 1, −1, −3 . . . .

In a number of repetitions box 156, how many labels L of the same content are to be printed before the increase, is designated by a number or an up-and-down button. In a maximum (minimum) value box 158, a maximum value is designated when the increment is positive (+) and a minimum value is designated when the increment is negative (−). An input in the maximum (minimum) value box 158 is optional and a check box 157 should be checked only when setting a maximum (minimum) value.

In a font box 159, a character font to be used for sequential numbers is selected from a menu. In a size box 160, a character size to be used for sequential numbers is selected from a menu. The character size can also be changed on the editing screen 91. In a character arrangement box 161, an arrangement within the sequential number block CB is selected from a menu (left-aligned, right-aligned, centered, full-justified or the like). In a style setting area 162, whether or not to apply each of italic, bold, underline, and strikethrough is designated.

Figure 5A:
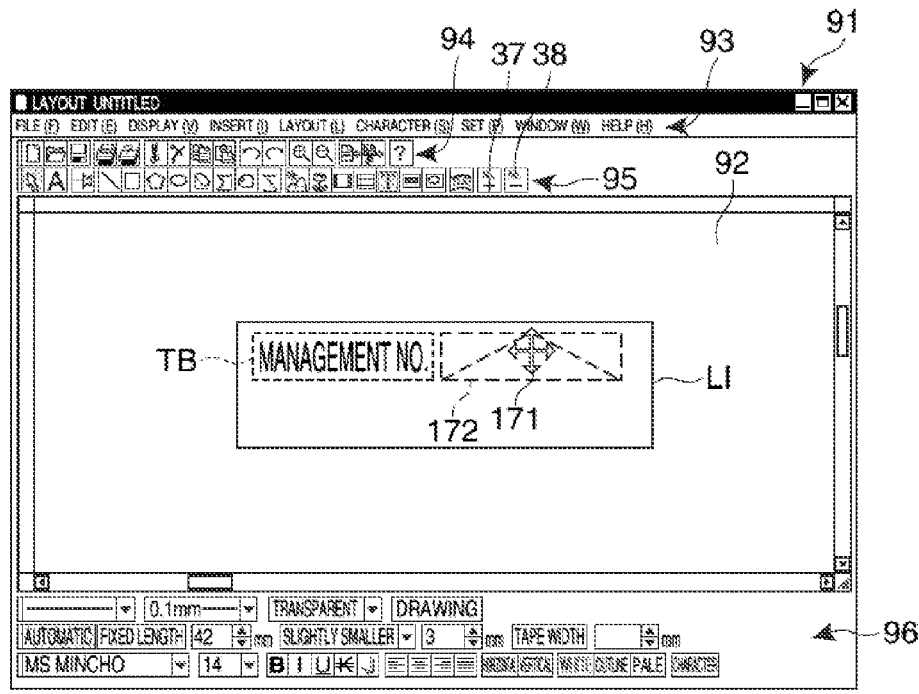
FIG. 5A shows an example of display of an arrow cursor and a block frame displayed before insertion of a sequential numbers.
Figure 5B:
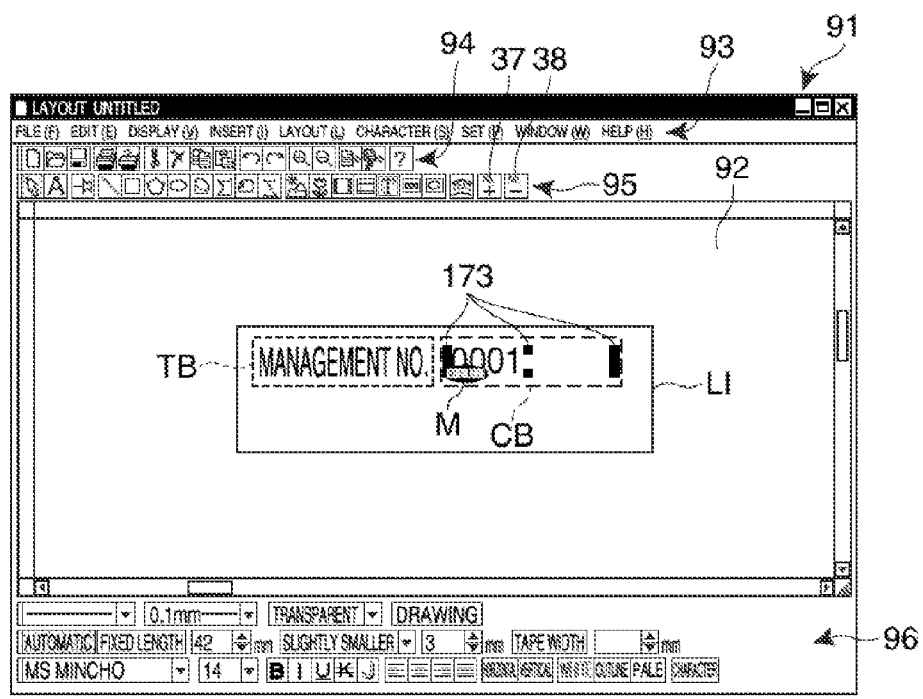
FIG. 5B shows an example of display of a handle and a sequential number mark displayed after insertion of a sequential number.

When an OK button 163 is pressed after the above setting items are set, an arrow cursor 171 indicating the position of insertion and a block frame 172 indicating the block range of the sequential number block CB are displayed on the editing screen 91 (see FIG. 5A). When the arrow cursor 171 is moved so that the block range reaches a desired position and the left button of the mouse 105 is clicked on, the sequential number block CB with handles 173 is displayed (see FIG. 5B). In this example, the four-digit number in the sequential number block CB corresponds to character information, and a sequential number mark M indicating that the number is a sequential number is displayed on the first character of the character information "0001". At this point, the character information within the sequential number information is displayed as an initial value. In the state where the sequential number block CB is displayed with the handles 173, the size and position of the sequential number can be changed, and the size and position of the sequential number is finalized by clicking on other positions than the sequential number.

FIGS. 6A and 6B show the result of sequential number printing. FIGS. 6A and 6B show the result of printing in the case where the first sequential number block CB is set as shown in FIG. 4, then the following setting is carried out as sequential number setting of the second sequential number block CB, and then the second sequential number block CB is arranged below the first sequential number block CB. The sequential number setting of the second sequential number block CB is attribute "numeric", format "IP 123.45.6#", initial value "1", increment "1", number of repetitions "1", maximum (minimum) value "not designated", font "MS Gothic", size "18", character arrangement "left-aligned", and style "not designated". In the following description, the first sequential number block CB is referred to as a "first sequential number block CB1" and the second sequential number block CB is referred to as a "second sequential number block CB2".

FIG. 6A shows the label L printed as the first sheet of sequential number printing. Also, the label image LI displayed in the editing area 92 before a print instruction is given is as shown in FIG. 6A. At this point, both the character information in the first sequential number block CB1 and the character information in the second sequential number block CB2 show the initial value (first: "0001", second "1"). After the print button 34 is pressed in this state and a print dialog box (not shown) is displayed, the number of sheets to be printed "30 sheets" is designated and the OK buttons is pressed. Thus, the control device 100 transmits print data for printing 30 sheets of the label L to the tape print device 1.

FIG. 6B shows the label L printed as the 30$^{th}$ sheet of sequential number printing. Also, the label image LI displayed in the editing area 92 after a print instruction is given (print data is transmitted) is as shown in FIG. 6B. At this point, both the character information in the first sequential number block CB1 and the character information in the second sequential number block CB2 show a value corresponding to the counter value "30" (first: "0030", second "30"). After the print instruction is given, the label image LI corresponding to the next counter value of the last label L to be printed may be displayed, instead of displaying the label image LI corresponding to the last label L to be printed.

Figure 3:
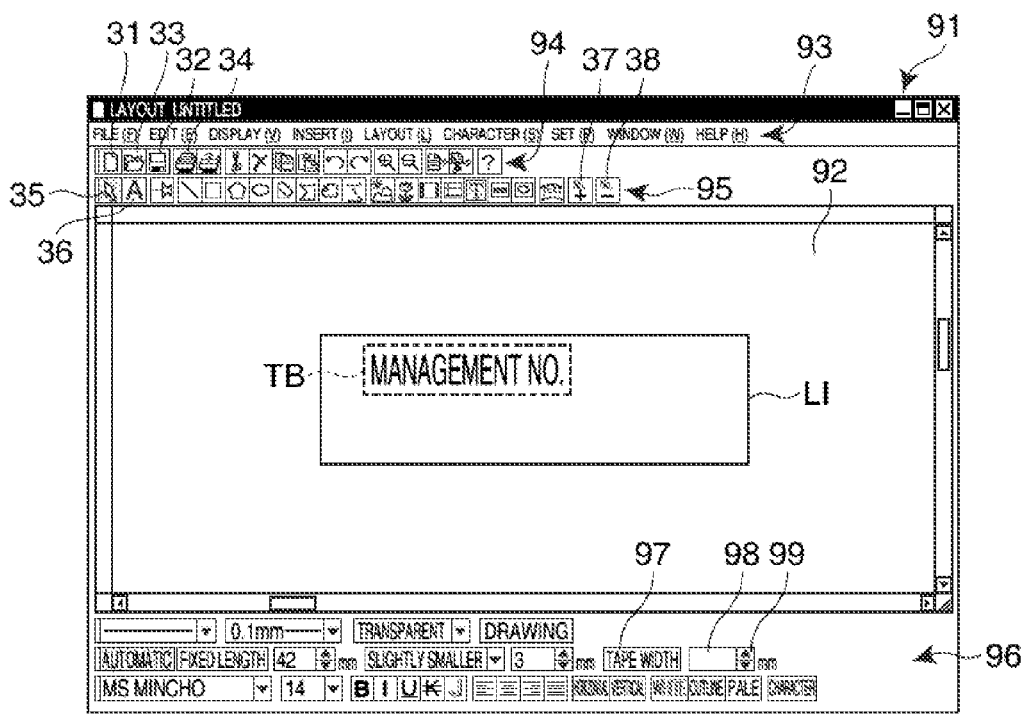
FIG. 3 shows an example of display on an editing screen.
Figure 7A:
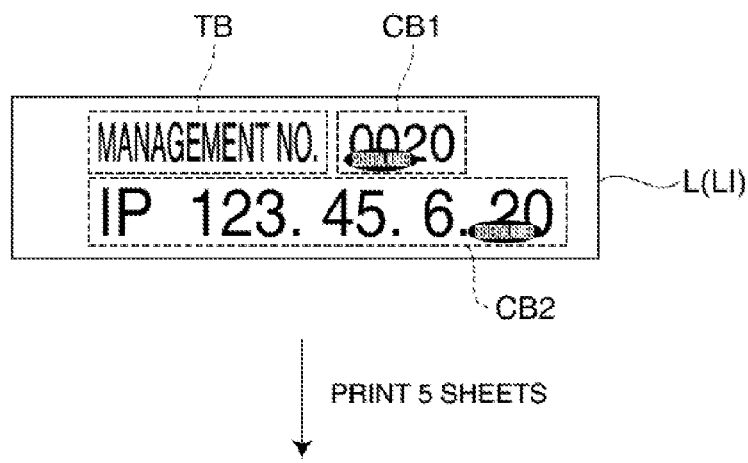
FIG. 7A shows a label image displayed before printing a sequential number.
Figure 7B:
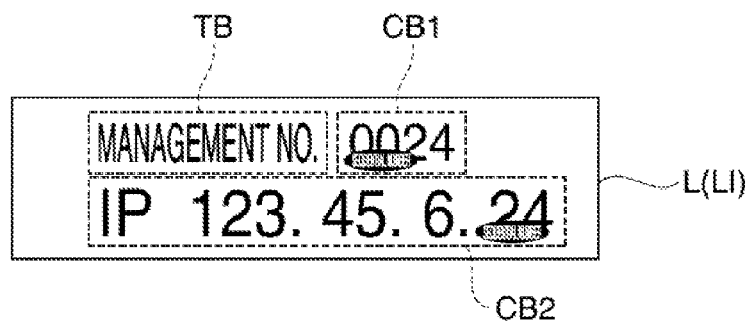
FIG. 7B shows a label image displayed after printing sequential numbers corresponding to 5 sheets.

By the way, to carry out partial re-execution of sequential number printing with the sequential number setting shown in FIGS. 6A and 6B, the increment button 37 and the decrement button 38 on the editing screen 91 shown in FIG. 3 are used. For example, when the decrement button 38 is pressed ten times in the state where the label image LI shown in FIG. 6B is displayed in the editing area 92, the label image LI shown in FIG. 7A is obtained. That is, the counter value can be designated as "20", which is decreased by "10" from "30". When a print instruction, for example, with the number of sheets to be printed "5 sheets", is given in this state, five sheets of the label L are printed and the label image LI displayed in the editing area 92 is as shown in FIG. 7B.

Although not particularly illustrated, when the increment button 37 is pressed, the counter value can be increased one by one. For example, when the increment button 37 is pressed ten times in the state where the label image LI shown in FIG. 6B is displayed in the editing area 92, the counter value can be designated as "40", which is increased by "10" from "30". By thus using the increment button 37 and the decrement button 38 displayed on the editing screen 91, partial re-execution of sequential number printing can be easily designated even when plural sequential number blocks CB (plural pieces of character information) exist on one label L.

In the example shown in FIG. 4 to FIGS. 6A and 6B, the case where the increment and the number of repetitions are set to "1" and no maximum (minimum) value is designated, is described. However, different sequential number setting can be carried out for each piece of character information. Now, the case where different sequential number setting is carried out for each piece of character information will be described with reference to FIGS. 8A and 8B. FIG. 8A shows an example of sequential number setting for three pieces of character information. That is, it is assumed that three sequential number blocks CB are set for one label image LI. FIG. 8B shows the relation between designated counter value and start value of each piece of character information.

For example, in the case where the counter value "0" expresses the state where each piece of character information is displayed as initial value (A: "0", B: "0", C: "0"), when the increment button 37 is pressed once to designate "1" as the counter value, each piece of character information changes to a value corresponding to the counter value "1" (A: "1", B: "0", C: "−1"). That is, on the label image LI displayed in the editing area 92, these values of the respective pieces of character information are displayed. When a print instruction is given, sequential number printing starts using these values as start value. Moreover, when the increment button 37 is pressed once again and to designate "2" as the counter value, each piece of character information changes to a value corresponding to the counter value "2" (A: "2", B: "2", C: "−2"). In this way, when the increment button 37 is pressed, the value corresponding to the counter value (=start value of sequential number printing) changes differently depending on the sequential number setting. That is, the start value of sequential number printing can be switched every time the increment button 37 or the decrement button 38 is pressed, in accordance with the setting of the increment and the setting of the number of repetitions for each piece of character information.

When a maximum (minimum) value is set for each piece of character information (see FIG. 8A), the start value can be switched within the range from the initial value and the maximum (minimum) value of each piece of character information every time the increment button 37 or the decrement button 38 is pressed (see FIG. 8B).

As described above, according to this embodiment, the current value (counter value) can be designated collectively with respect to the character information in all the sequential number blocks with sequential number setting on the label image LI in the editing area 92. Therefore, partial re-execution of sequential number printing can easily be carried out irrespective of the number of sequential number blocks CB.

Since the counter value of sequential number printing is designated as the current value, an appropriate value can be designated irrespective of the sequential number setting of each piece of character information. If the start value itself of the sequential number setting is designated as the current value, the value may fall between the initial value and the maximum (minimum) value of the sequential number setting and therefore the designation of the current value may be invalid. However, the configuration to designate the counter value is employed, such inconvenience can be eliminated.

Also, since the increment button 37 and the decrement button 38 are provided on the editing screen 91, the counter value can easily be designated without needing an operation to display a particular dialog box or text menu. Moreover, since the start value of each piece of character information (the value of each piece of character information printed on the first sheet of the label L when sequential number printing is designated) is displayed on the label image LI shown in the editing area 92, the user can confirm the accurate result of printing.

Furthermore, since initial value, end value (maximum value or minimum value), number of repetitions, and increment can be set as sequential number setting, the start value can be switched every time the increment button 37 or the decrement button 38 is pressed, within the range from the initial value and the end value set for each piece of character information, and in accordance with the setting of the number of repetitions and the setting of the increment set for each piece of character information.

Modification 1

Also, the following medications can be employed. For example, while the counter value is designated as the current value in the above embodiment, the start value itself may be designated. In this case, the control device 100 (print instruction unit) gives an instruction to carryout sequential number printing, using the designated current value as the start value. FIG. 9A shows an example of sequential number setting according to Modification 1. In this way, sequential number setting is carried out with respect to two pieces of character information. When the current value (start value) is designated as shown in FIG. 9B, the relation between the number of times of print and the value of each piece of character information is as shown in FIG. 9C.

That is, when no current value (=start value) is designated, the value of character information A changes in order of 0, 1, 2, 3 . . . as the number of times of print increases in order of 1, 2, 3, 4 . . . , according to the sequential number setting (see FIG. 9A). However, when "2" is designated as the current value (=start value) (see FIG. 9B), the value changes in order of 2, 3, 0, 1 . . . as the number of times of print increases in order of 1, 2, 3, 4 . . . (see FIG. 9C). Similarly, when no current value (=start value) is designated, the value of character information B changes in order of 0, 0, 2, 2 . . . as the number of times of print increases in order of 1, 2, 3, 4 . . . , according to the sequential number setting (see FIG. 9A). However, when "2" is designated as the current value (=start value) (see FIG. 9B), the value changes in order of 2, 2, 4, 4 . . . (see FIG. 9C).

Thus, according to Modification 1, the start value of sequential number printing can be designated collectively. In the example of FIGS. 9A to 9C, the same sequential number setting of the character information A and B as in FIG. 8A is used in order to demonstrate the difference from the above embodiment. However, this example is convenient when the same sequential number setting is made with respect to plural pieces of character information. That is, when such setting that the value changes in order of 0, 1, 2, 3 . . . as the number of times of print increase in order of 1, 2, 3, 4 . . . is provided for both the character information A and B, the start value can be designated directly and therefore the operation is easy.

Modification 2

Alternatively, with the designation of the current value, the initial value of each piece of character information may be rewritten with the designated current value (current value designating unit). That is, it is possible to enable designation of the initial value of each piece of character information, using the increment button 37 and the decrement button 38. FIG. 10A shows an example of sequential number setting according to Modification 2 (similar to FIG. 9A). In this manner, sequential number setting is carried out with respect to two sequential number blocks CB. When the initial value is rewritten by the designation of the current value (start value) a shown in FIG. 10B, the sequential number setting after the change is as shown in FIG. 10B. Also, the relation between the number of times of print and the value of each piece of character information based on the sequential number setting after the change is as shown in FIG. 10C.

Thus, according to Modification 2, the initial value of sequential number printing can be rewritten collectively. When no maximum (minimum) value is set, the relation between the number of times of print and the value of each piece of character information is the same between Modification 1 and Modification 2. In Modification 1 and Modification 2, when an inappropriate current value (start value) is designated (when a character is not designated within the range from the initial value to the end value, or the like), a warning message is displayed.

While the counter value (current value) is designated using the increment button 37 and the decrement button 38 in the above embodiment and modifications, the counter value may be designated by directly inputting a character (numeric or alphabetic).

Also, while the processing on the side of the control device 100 is mainly described in the above embodiment and modifications, the invention may be realized by the tape print device 1 as a standalone unit. That is, in the tape print device 1, sequential number setting to carry out sequential number printing and designation of a current value (counter value or start value) maybe carried out (sequential number setting unit, current value designating unit), and sequential number printing according to the sequential number setting may be started with the designated current value (sequential number print unit). In this case, it can be considered that the sequential number setting is carried out by designating "sequential number printing" from menu items displayed by pressing a specific key on the keyboard 3. It can be considered that the designation of the current value is carried out using an increment button or a decrement button provided on the keyboard 3.

Also, the function (dedicated software 122) to realize sequential number printing described in the above embodiment may be provided as a program. The program may be provided in the form of being stored in various storage media (CD-ROM, flash memory and the like). That is, a program to realize the sequential number printing described in the above embodiment and a recording medium on which the program is recorded are included in the invention.

Moreover, while the case of carrying out sequential number printing on the label L is described in the above embodiment, the invention can also be applied to the case of carrying sequential number printing on other print media than the label L. In this case, the current value is collectively designated with respect to all character information with sequential number setting in one document (one page, one file or the like). Also, while a personal computer is described as an example of the control device 100, various information processing terminals such as smartphone and tablet terminal may also be used. Moreover, the invention can be applied to a cloud computing configuration in which the function of the dedicated software 122 is provided on a server and operations are carried out from a user terminal, or the like. In addition, various other suitable changes can be made without departing from the scope of the invention.

What is claimed is:

1. A control device which designates sequential number printing to print while updating character information, comprising:
   a sequential number setting unit which carries out sequential number setting to carry out the sequential number printing, on the character information;
   a current value designating unit which collectively designates a current value to all the character information with sequential number setting, in one document;
   a print instruction unit which gives an instruction to start the sequential number printing at the current value that is designated; and
   a display section which switches and displays the start value of the sequential number printing in each piece of character information,
   wherein
      the character information with the sequential number setting is updated based on a predetermined update rule and a counter value of the sequential number printing,
      the current value designating unit designates the counter value as the current value,
      the current value designating unit designates the current value by pressing a button which causes the counter value to change one by one, and
      the display section switches and displays the start value of the sequential number printing in each piece of character information every time the button is pressed.

2. The control device according to claim 1, wherein the sequential number setting unit is capable of setting an initial value and an end value of the sequential number printing, and
   the display section switches the start value within a range between the initial value and the end value of each piece of character information every time the button is pressed.

3. The control device according to claim 1, wherein the sequential number setting unit is capable of setting a number of repetitions and an increment of the sequential number printing, and
   the display section switches the start value every time the button is pressed, in accordance with the setting of the number of repetitions and the setting of the increment for each piece of character information.

4. The control device according to claim 1, wherein the print instruction unit gives an instruction to perform the sequential number printing in which the current value that is designated is used as a start value.

5. The control device according to claim 4, wherein the sequential number setting unit is capable of setting an initial value of the sequential number printing, and
   the current value designating unit rewrites the initial value of each piece of character information with the current value that is designated, as the current value is designated.

6. A print system comprising:
   the control device according to claim 1; and
   a print device which carries out the sequential number printing.

7. A print device capable of executing sequential number printing to print while updating character information, comprising:
   a sequential number setting unit which sets sequential numbers to carry out the sequential number printing, on the character information;
   a current value designating unit which collectively designates a current value to all the character information with sequential number setting, in one document;
   a sequential number print unit which starts the sequential number printing at the current value that is designated; and
   a display section which switches and displays the start value of the sequential number printing in each piece of character information,
   wherein
      the character information with the sequential number setting is updated based on a predetermined update rule and a counter value of the sequential number printing,
      the current value designating unit designates the counter value as the current value,
      the current value designating unit designates the current value by pressing a button which causes the counter value to change one by one, and
      the display section switches and displays the start value of the sequential number printing in each piece of character information every time the button is pressed.

8. A program stored in a non-transitory computer-readable storage medium that allows a computer to perform a print control method for controlling sequential number printing to print while updating character information, the print control method comprising:

carrying out sequential number setting to carry out the sequential number printing, on the character information;

collectively designating a current value to all the character information with sequential number setting, in one document;

performing control to start the sequential number printing at the current value that is designated;

updating the character information with the sequential number setting based on a predetermined update rule and a counter value of the sequential number printing;

designating the counter value as the current value;

designating the current value by pressing a button which causes the counter value to change one by one; and switching and displaying the start value of the sequential number printing in each piece of character information every time the button is pressed on a display section.

9. The program stored in the non-transitory computer-readable storage medium according to claim 8, the print control method further comprising setting an initial value and an end value of the sequential number printing, and switching the start value within a range between the initial value and the end value of each piece of character information every time the button is pressed.

10. The program stored in the non-transitory computer-readable storage medium according to claim 8, the print control method further comprising setting a number of repetitions and an increment of the sequential number printing, and switching the start value every time the button is pressed, in accordance with the setting of the number of repetitions and the setting of the increment for each piece of character information.

11. The program stored in the non-transitory computer-readable storage medium according to claim 8, the print control method further comprising:

giving an instruction to perform the sequential number printing in which the current value that is designated is used as a start value.

12. The program stored in the non-transitory computer-readable storage medium according to claim 11, the print control method further comprising:

setting an initial value of the sequential number printing, and rewriting the initial value of each piece of character information with the current value that is designated, as the current value is designated.

* * * * *